US012686203B2

(12) United States Patent
Davies

(10) Patent No.: US 12,686,203 B2

(45) Date of Patent: Jul. 21, 2026

(54) IMAGE REGISTRATION IN A CAN DECORATOR

(71) Applicant: CROWN PACKAGING TECHNOLOGY, INC., Alsip, IL (US)

(72) Inventor: Mark Ian Davies, Oxfordshire (GB)

(73) Assignee: Crown Packaging Technology, Inc., Alsip, IL (US)

( * ) Notice: Subject to any disclaimer, the term of this patent is extended or adjusted under 35 U.S.C. 154(b) by 121 days.

(21) Appl. No.: 16/320,564

(22) PCT Filed: Jul. 26, 2017

(86) PCT No.: PCT/EP2017/068939

§ 371 (c)(1),
(2) Date: Jan. 25, 2019

(87) PCT Pub. No.: WO2018/019912

PCT Pub. Date: Feb. 1, 2018

(65) Prior Publication Data

US 2019/0270298 A1 Sep. 5, 2019

(30) Foreign Application Priority Data

Jul. 29, 2016 (GB) ..................................... 1613162

(51) Int. Cl.
*B41F 13/14* (2006.01)
*B41F 3/58* (2006.01)
(Continued)

(52) U.S. Cl.
CPC ................ *B41F 13/14* (2013.01); *B41F 3/58* (2013.01); *B41F 5/18* (2013.01); *B41F 17/22* (2013.01); *B41F 33/02* (2013.01); *B41P 2233/13* (2013.01)

(58) Field of Classification Search
CPC ........... B41F 13/14; B41F 17/22; B41F 13/12
(Continued)

(56) References Cited

U.S. PATENT DOCUMENTS 4,741,266 A * 5/1988 Stirbis ..................... B41F 17/22 29/469
5,819,648 A * 10/1998 Megyesi ................ B41F 17/22 101/216
(Continued)

FOREIGN PATENT DOCUMENTS

CN 101181837 A 5/2008
CN 102381013 A 3/2012
(Continued)

*Primary Examiner* — Stephen D Meier
*Assistant Examiner* — Leo T Hinze
(74) *Attorney, Agent, or Firm* — Condo Roccia Koptiw LLP

(57) ABSTRACT

A can decorator having a blanket wheel and a plurality inking stations. Each of one or more of the inking stations comprises a rotatable shaft geared to the blanket wheel, a print cylinder mounted on the shaft for rotation with the shaft during printing operations, and an adjustment mechanism for adjusting the angular position of the print cylinder on the rotatable shaft during set-up and for fixing the angular position for printing operations. There is further provided a rotary encoder for determining the angular position of the print cylinder relative to the rotatable shaft during set-up and for providing an electrical signal indicative of the angular position to an operator interface device.

14 Claims, 7 Drawing Sheets

(51) Int. Cl.

| | |
|---|---|
| ***B41F 5/18*** | (2006.01) |
| ***B41F 17/22*** | (2006.01) |
| ***B41F 33/02*** | (2006.01) |

(58) Field of Classification Search
USPC .......................................................... 101/248
See application file for complete search history.

(56) References Cited

U.S. PATENT DOCUMENTS

| | | | | |
|---|---|---|---|---|
| 2008/0141886 | A1 | 6/2008 | Whitelaw et al. | |
| 2009/0224500 | A1* | 9/2009 | Raschke .................. | G01D 5/04 280/93.5 |
| 2010/0018419 | A1* | 1/2010 | Whitelaw ................. | B41F 5/20 101/248 |
| 2014/0173920 | A1* | 6/2014 | Basler .................... | G01D 5/347 33/1 PT |
| 2015/0260549 | A1 | 9/2015 | Howard | |
| 2016/0238364 | A1* | 8/2016 | Wu ........................ | G01B 3/205 |
| 2018/0009217 | A1* | 1/2018 | Kilde ...................... | B41F 17/22 |

FOREIGN PATENT DOCUMENTS

| | | | |
|---|---|---|---|
| CN | 103909724 | A | 7/2014 |
| CN | 105764692 | A | 7/2016 |
| EP | 1916102 | A1 | 4/2008 |
| EP | 3028856 | A1 | 6/2016 |
| JP | S63-239056 | A | 10/1988 |
| JP | 2002240236 | A | 8/2002 |
| JP | 2008213474 | A | 9/2008 |
| JP | 2008-290784 | A | 12/2008 |
| JP | 2010-167711 | A | 8/2010 |
| JP | 2014-117825 | A | 6/2014 |
| WO | WO 2015/046119 | A1 | 4/2015 |
| WO | WO 2016/008700 | A1 | 1/2016 |

* cited by examiner

IMAGE REGISTRATION IN A CAN DECORATOR

CROSS-REFERENCE TO RELATED APPLICATIONS

This application is the National Stage of International Application No. PCT/EP2017/068939 filed Jul. 26, 2017, which claims the benefit of GB application number 1613162.5, filed Jul. 29, 2016, the disclosures of which are incorporated herein by reference in their entirety.

FIELD OF INVENTION

The present invention relates to ensuring correct registration of images in can decorators that utilise a blanket wheel to facilitate offset printing.

BACKGROUND

Can decorators are known in the art for applying decoration to the external surface of a can body. Printing typically involves a multi-stage stage offset printing operation. This involves inking of print plates, transferring images from the printing plates to blankets on a blanket wheel, and then transferring the images from the blankets to the can bodies.

FIG. 1 is a schematic diagram illustrating the main features of a typical prior art can decorator 1. On the left hand side of the illustration there is shown a can body conveying mechanism 2 comprising a set of mandrels 3 each rotatable about a central axis. Unprinted or "blank" can bodies 4 are loaded onto the mandrels in turn. The loaded can bodies are moved into a printing zone 5 where the can bodies are brought into contact, i.e. rolled across, pre-inked blankets 6 mounted on a blanket wheel 7. FIG. 1 illustrates a blanket wheel comprising eight blankets. Typically, each blanket 6 has a smooth printing surface onto which an image is inked (blankets with secondary images etched or otherwise formed on their surfaces are also known). On the other side of the blanket wheel 7, a plurality of ink stations 8 are provided, typically with one ink station for each colour to be printed. In FIG. 1, six ink stations 8 are shown, each comprising an ink reservoir 9, a printing cylinder 10, a printing plate 11 provided on the print cylinder, and an ink delivery mechanism 12 comprising a set of an inking rollers for ensuring even application of ink from the reservoir to the printing plate. The printing plate is a curved plate engraved with an image to be printed. Each print cylinder 10 is mounted on a rotating drive mechanism (not shown) which is rotated in synchronization with the blanket wheel.

Each blanket 6 passes through the ink stations 8 in sequence such that a blanket leaving the final ink station has a composite, i.e. multi-colour, ink image formed on its printing surface. This composite image is transferred to a can body in the printing zone when the blanket and the can body are counter-rotated against one another.

FIG. 2 further illustrates a multiple colour printing process. In the example shown, six colours are used, requiring six ink stations. In the example, ink stations are provided for yellow 13, pink 14, orange 15, green 16, blue 17 and red 18. The six colours are then transferred to six printing plates 11. The inked areas of the printing plates are offset from one another so that the colours do not overlap. The next step comprises transferring the ink from each of the printing plates in turn to the printing surface of the blanket 6. The blanket is then moved around with the blanket wheel to the printing zone, whereupon the ink is transferred so as to put the required image onto a can body 4.

It will be appreciated that the printing plates 11 must be correctly aligned with one another and with respect to the blankets 6 in order to achieve the correct final image on the print blankets 6. This is achieved in part by allowing the angular position of the print cylinders on their respective drive mechanisms to be manually adjusted. The process of correctly aligning multiple colours to form a single composite image is referred to in the art of printing as "registration".

SUMMARY

According to a first aspect of the present invention there is provided a can decorator having a blanket wheel and a plurality inking stations. Each of one or more of the inking stations comprises a rotatable shaft geared to the blanket wheel, a print cylinder mounted on the shaft for rotation with the shaft during printing operations, and an adjustment mechanism for adjusting the angular position of the print cylinder on the rotatable shaft during set-up and for fixing the angular position for printing operations. There is further provided a rotary encoder for determining the angular position of the print cylinder relative to the rotatable shaft during set-up and for providing an electrical signal indicative of the angular position to an operator interface device.

In an embodiment, the rotary encoder comprises a first section and a second section, the first section being in a fixed position relative to a main body of the inking station and the second section being in a fixed position relative to the print cylinder. In use one of these sections rotates past and opposes the other of the sections and detects this passage as a way of detecting angular position In an embodiment, the first section is attached to the main body of the inking station.

In an embodiment, the first section is attached to the rotatable shaft.

In an embodiment, the first section comprises active components and the second section comprises a passive device.

In an embodiment, the rotary encoder is an induction encoder. This may comprises a laminar construction comprising etched copper or printed coils.

In an embodiment, the print cylinder is mounted on the rotatable shaft via a sleeve, said second section of the induction encoder being fixed to the sleeve, opposed to but spaced apart from said first section.

In an embodiment, the can decorator further comprises a linear position sensor for obtaining a measurement of an axial position of the cylinder relative to the shaft and for providing an electrical signal indicative of the axial position to the operator interface device.

According to a second aspect of the present invention there is provided a method of performing print registration in a can decorator having a blanket wheel and a plurality of inking stations, each inking station having a print cylinder and a rotatable shaft, the method comprising, for each of one or more of the inking stations, performing a set-up procedure including using a rotary encoder to detect an angular position of the print cylinder relative to the rotatable shaft on which the print cylinder is mounted, and adjusting the angular position of the print cylinder on the shaft using the detected angular position.

In an embodiment, using the rotary encoder to detect the angular position of the print cylinder relative to the rotatable shaft comprises the step of measuring an angular position of the print cylinder relative to a location on the respective inking station.

In an embodiment, the method further comprises, for one or more of the inking stations, using a linear position sensor to detect an axial position of a print cylinder relative to the rotatable shaft, and adjusting the axial position of the print cylinder on the shaft using the detected axial position.

In an embodiment, the step of adjusting the angular position of the print cylinder on the shaft using the detected angular position comprises displaying the detected angular position on a display whilst manually performing the adjustment.

DETAILED DESCRIPTION

Embodiments will now be described more fully hereinafter with reference to the accompanying drawings, in which certain embodiments are shown. However, other embodiments in many different forms are possible within the scope of the present disclosure. The following embodiments are therefore provided by way of example so that this disclosure will be thorough and complete, and will fully convey the scope of the disclosure to those skilled in the art.

Figure 1:
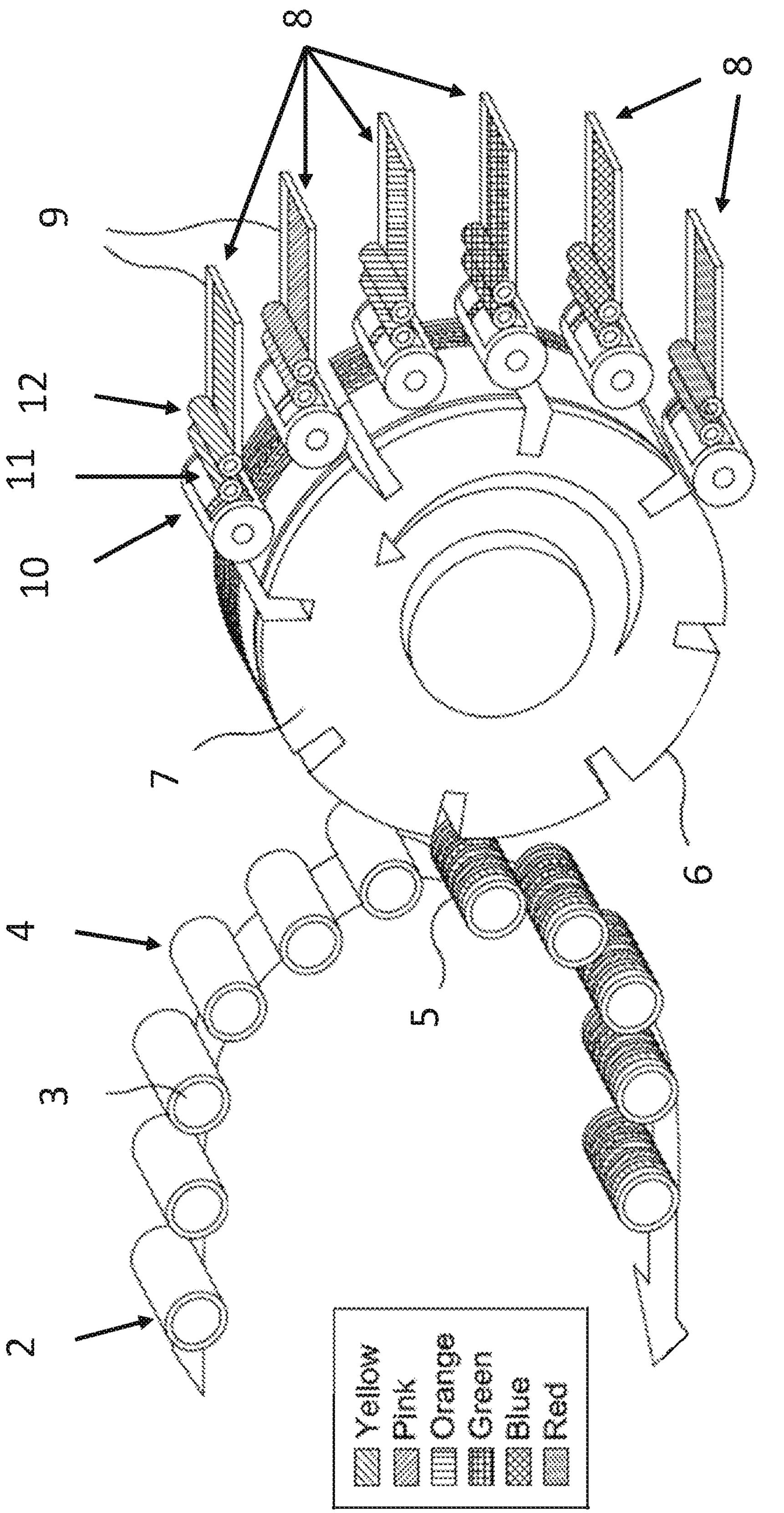
Figure 1 (Prior Art)
FIG. 1 is a schematic diagram of a can decorator according to the prior art.
Figure 2:
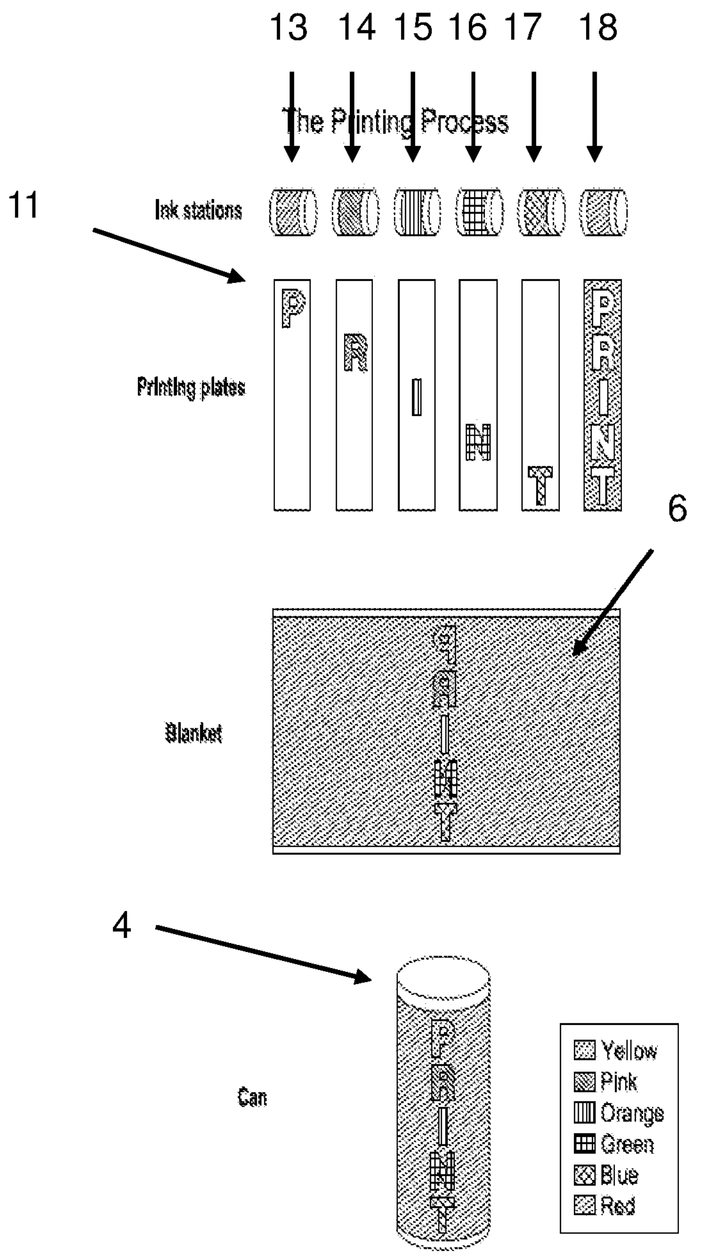
FIG. 2 is a diagram illustrating the process of printing on a can surface using the decorator of FIG. 1.

A conventional can blanket decorator has been described above with reference to FIG. 1. For the purpose of the following discussion it can be assumed that the only changes proposed to the can decorator are changes to the inking stations, and specifically changes to mechanisms for determining an angular position of the print cylinders relative to the main body of the inking station.

In order to achieve accurate alignment of each of the colour components to be printed by the blanket decorator, the print cylinder for each of the colour components must be positioned rotationally and axially (with respect to its own axis of rotation) so that, when the print plate on the cylinder comes into contact with the print blanket, the colour is transferred correctly relative to the other colour components. As discussed above, rotational alignment can be achieved by rotating the print cylinder on the rotating drive mechanism on which it is located, during a set up operation. This typically involves a trial and error procedure during which a skilled operator adjusts each of the print cylinders in turn until accurate registration of the printed image is achieved. This usually involves printing sample cans and visually inspecting the printed cans. The present disclosure aims to provide a means to assist the operator to achieve faster and more accurate registration.

Each inking station comprises a rotatable shaft for rotating the print cylinder. This shaft is geared with the blanket wheel. During the set-up process, this shaft is held in a stationary position relative to the main body of the inking station. The print cylinder comprises a sleeve which fits around the shaft. The print plates are attached to the surface of the cylinder at a fixed position. During the set-up procedure, the angular position of the cylinder is adjusted relative to the shaft. The adjustment of the angular positions of the cylinders in each of the inking stations relative to the inking stations' drive shafts enables the alignment or registration of the print plates relative to each other and ensures that the colours are applied in a correctly coordinated manner. Once the correct position of the cylinder has been achieved, the cylinder is fixed into position prior to commencement of inking.

The method disclosed here uses a rotary encoder located at an inking station and configured to measure an angular position of a print cylinder relative to the shaft on which the cylinder is located. In an embodiment, this is performed by directly measuring the angular position of the print cylinder relative to the shaft. In an alternative embodiment, the angular position measurement is made between the print cylinder and the body of the inking station. As, during set-up, the shaft is stationary relative to the body, the encoder effectively measures angular position of the print cylinder relative to the shaft on which the cylinder is located.

A rotary encoder, also called a shaft encoder, is a device which measures an angular position of a shaft or axle and converts the measurement into analogue or digital codes. The measurements are used, if necessary, to reposition the print cylinder prior to operation so that the print plate makes contact with the blanket in a desired position. The information from the rotary encoder may be displayed with an output device such as a display screen in order to assist with manual adjustment of the print cylinder position.

Types of rotary encoder include electro-mechanical encoders, optical encoders, magnetic encoders and capacitive encoders. Electro-mechanical encoders typically comprise metallic contacts etched into a circuit board such as to produce conductive and non-conductive areas. Brush contacts connected to electrical sensors slide over these areas. The pattern of conductive areas is designed so that each possible position of the axle creates a unique binary code in which some of the contacts are connected to the current source and others are not.

An optical encoder typically comprises a disc with opaque and transparent areas, or alternatively reflective and non-reflective areas. The encoder utilizes a light source and a photodetector. As the angular position of the disc changes, different optical patterns are observed by the detector. These patterns are then used to determine the angular position.

A magnetic encoder uses a series of magnetic poles to identify the encoder position. A magnetic sensor, such as a Hall Effect sensor, is used to read the pole positions.

A capacitive encoder typically comprises an asymmetrical shaped disc which is rotated within the encoder. The movement of the disc changes the capacitance between two electrodes. This capacitance is measured and the result used to determine angular position.

An inductive encoder typically uses an arrangement of coils in a rotatable body which cause a variation in mutual induction with coils in a static body, as the position of the rotatable body changes. The change in mutual inductance causes a change in voltage in receiver coils in the static body, which can be used to determine angular position.

Inductive encoders have the advantage that they are more resistant to water, dirt, condensation and electrostatic effects than other types of encoder, particularly capacitive encoders.

In an embodiment, the inductive rotary encoder comprises a printed laminar construction. Such an arrangement replaces the wound spools of a traditionally constructed induction detector with windings produced from etched copper or by printing on a wide variety of substrates such as polyester film, paper, epoxy laminates or ceramics. Printed laminar constructions can be made much more accurately than conventional windings. Improved measurement performance may be attained. Additionally an encoder utilizing a printed laminar may be lighter and less bulky. US2015/0260549 and WO2005/003687 disclose inductive displacement detectors of this type. In an embodiment presented here, an inductive rotary encoder of this type is used to track changes in the angular position of the print cylinder relative to the rotatable shaft on which it is located.

In an embodiment, the rotary encoder comprises a first section and a second section. In an embodiment, the first section is attached to the main body of the inking station. The second section is attached to the print cylinder. An advantage of this embodiment is that it allows easy retro-fitting of the rotary encoder. In an alternative embodiment, the first section is attached to the rotatable shaft.

Figure 3:
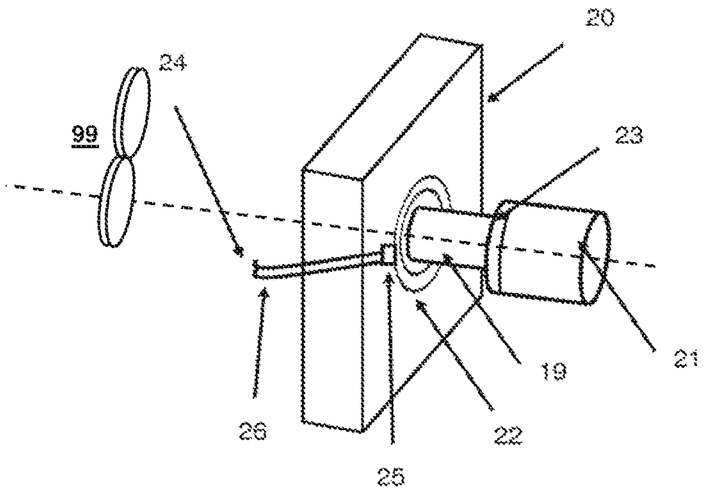
FIG. 3 is a perspective view of a partially installed print cylinder and shaft, with rotary encoder fitted.

FIG. 3 is a perspective view of a print cylinder and shaft according to an embodiment, with the former partially removed. An intermediate mounting sleeve, described further below, is assumed to form a single unit together with the print cylinder. The shaft 19 is rotationally mounted in a main body 20 of an inking station. The print cylinder 21 fits over the shaft and, in operation, is fixed to rotate with the shaft. As illustrated schematically by reference number 99 in FIG. 3, the shaft is geared with the blanket wheel so that, in operation, it rotates in synchronization with the blanket wheel and with the other print cylinders. During set-up, the print cylinder is movable with respect to the shaft to enable correct alignment.

A first section of a rotary encoder 22 is attached to the main body 20 of the inking station. A second section 23 of the rotary encoder is attached to the print cylinder 21. The first section 22 is an active device, which is provided with a power supply 24, electronics for converting a signal from the inductive device into an angular position 25 and communication wires 26 for passing angular position data to an external device. The second section 23 is a passive device which comprises an inductive target. The first section comprises transmit windings which are supplied with an alternating current. An electromagnetic field is created which envelops the inductive target. The windings in the first and second sections are arranged so that mutual inductance between the sections varies as the angular position changes. The first section has receive windings, which create an output signal, which varies with relative angular position of the first and second sections. The person skilled in the art will appreciate that other arrangements for the inductive rotary encoder are possible. The invention is not limited to any one arrangement of rotary encoder.

Figure 4:
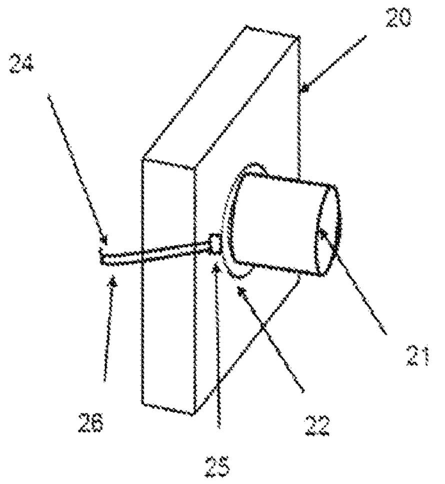
FIG. 4 is a perspective view of a print cylinder and shaft in an assembled state.

FIG. 4 is a perspective view of the arrangement of FIG. 3, with the print cylinder moved to its normal operating position. During set-up, the cylinder may be rotated relative to the shaft so as to correctly align it with print cylinders at other inking stations, whilst the shaft itself is kept in a stationary position. During the set-up process, measurements are made of the angular position of the print cylinder relative to the main body of the inking station, using the rotary encoder. Since, during set-up, the shaft is held in a fixed position relative to the main body of the inking station, this reading indicates the angular position of the cylinder relative to the shaft. NB. The absolute position is not necessarily important. What is important is that the system can be used to track changes to the angular position of the print cylinder, relative to the shaft, as the operator rotates the cylinder on the shaft.

Measurements are typically displayed on an output device, which enables the operator to make adjustments, using an adjustment mechanism, in the angular position of the print cylinder. At the start of the process the operator may choose to "zero" the display so that the display reflects the amount of adjustment performed. This process is repeated for the print cylinder in each of the inking stations. By measuring and correcting the angular positions of each of the cylinders relative to their drive shafts, correct alignment of the print cylinders relative to each other may be achieved. This ensures the correct registration of the print plates located on the print cylinders.

Figure 5:
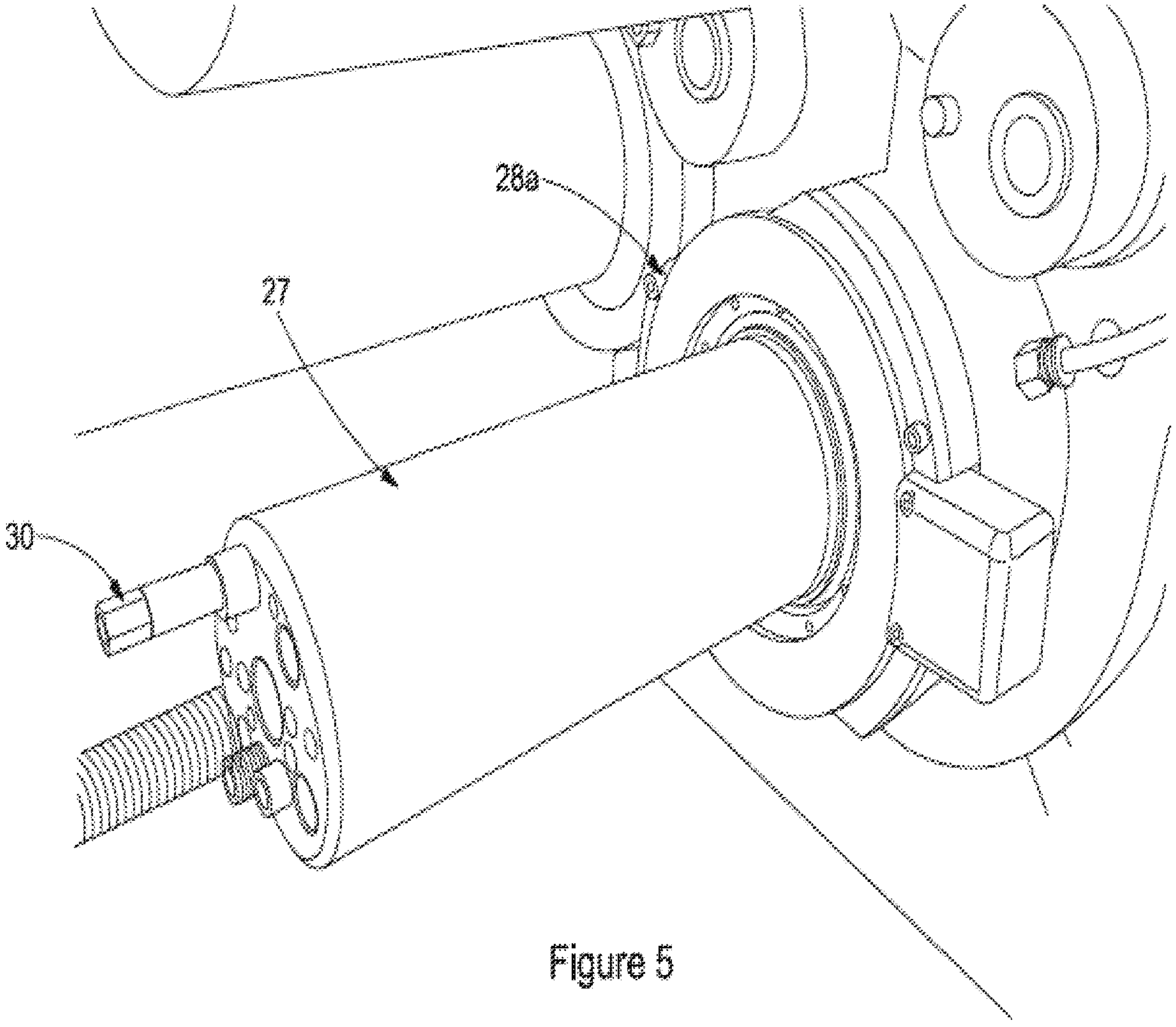
FIG. 5 is a perspective view of of a partially disassembled inking station including a rotatable shaft.
Figure 6:
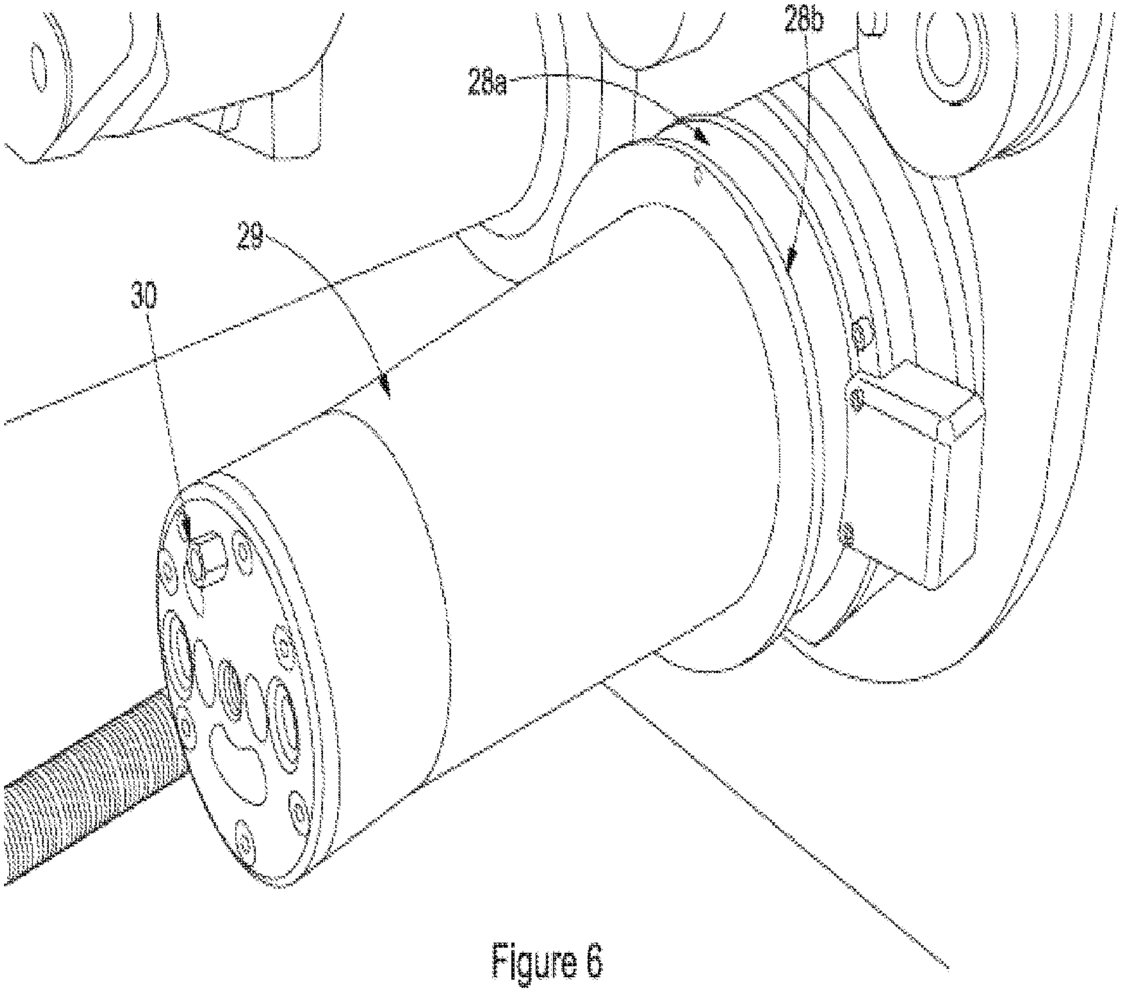
FIG. 6 is a perspective view of the inking station of FIG. 5 with a support sleeve fitted over the shaft.

FIGS. 5 and 6 are perspective views of an inking station incorporating a rotary encoder according to an embodiment. FIG. 5 shows the shaft 27 which is used to drive the print cylinder. A first section 28*a* of a rotary encoder is attached to the main body of the inking station, which remains static during the print plate registration process. FIG. 6 illustrates a sleeve 29 fitted over the shaft 27. The sleeve is rotatable with respect to the shaft via a mechanism 30. A second section 28*b* of the rotary encoder is fixed to the sleeve 29, opposed but spaced apart from the first section 28*a*.

Figure 7:
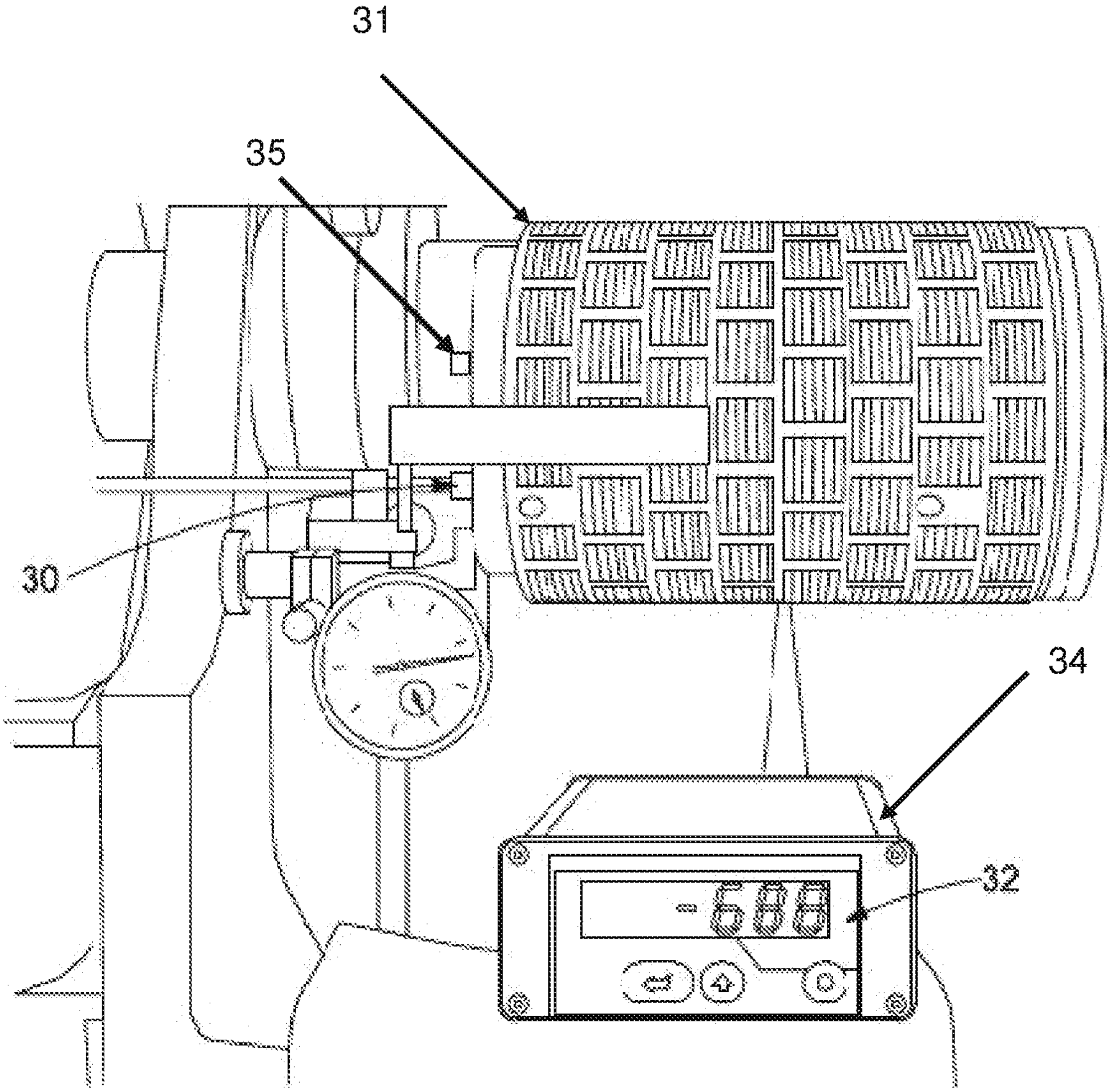
FIG. 7 is a perspective view of an assembled inking station including a display unit.

FIG. 7 is a perspective view of the assembled inking station during set up using the rotary encoder, according to an embodiment. A print cylinder 31 is fitted over the sleeve 29 such that these two components are fixed together. A display unit 32 is coupled to the rotary encoder to display the output. Using the mechanism 30, the operator is able to rotate the print cylinder and sleeve around the shaft 27 whilst observing the change in the value displayed by the display unit 32 of an operator interface device 34. Highly accurate measurements are available, which enable precise manual adjustment of the angular position of the cylinder on the shaft.

Figure 8:
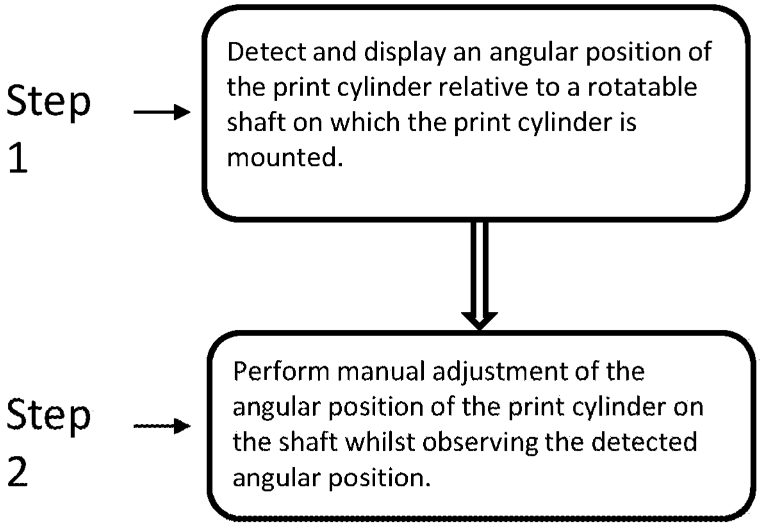
FIG. 8 is a flow chart illustrating a method of aligning a print cylinder according to an embodiment.

FIG. 8 is a flow chart illustrating a method of performing print registration in a can decorator having a blanket wheel and a plurality of inking stations according to an embodiment. The first step comprises, for one or more of the inking stations, using the rotary encoder to detect an angular position of a print cylinder relative to a rotatable shaft on which the print cylinder is mounted (step 1). The output is displayed to the operator. The second step (step 2) comprises manually adjusting 33 the angular position of the print cylinder on the shaft using the detected angular position.

In practice, an operator might at this stage run the decorator in order to print an image on a can, and then check registration of the various colours again. If an offset between colours remains, he can repeat the procedure of FIG. 8 again, for the same or different inking stations. This procedure is repeated until the registration is satisfactory.

Figure 9:
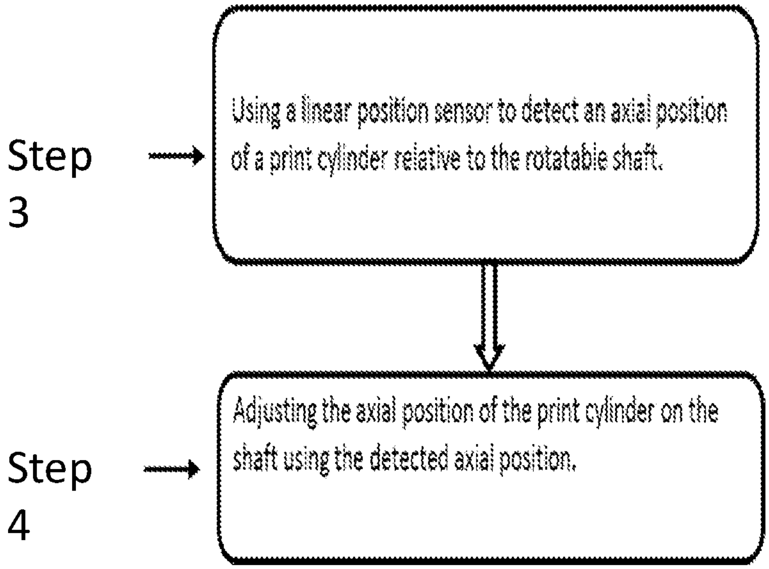
FIG. 9 is a flow chart illustrating a method of axially aligning a print cylinder according to an embodiment.

In an embodiment, a further linear position sensor 35 is provided to enable the measurement of an axial displacement of the print cylinder along its shaft. FIG. 9 is a flow chart illustrating a method according to an embodiment, in which the axial alignment of the print cylinder along the shaft is also adjusted. The method comprises, for one or more of the inking stations, using a linear position sensor to detect an axial position of a print cylinder relative to the rotatable shaft (step 3), and adjusting (step 4) the axial position of the print cylinder on the shaft using the detected axial position. Again, the process may be repeated, with printing between each adjustment process, until all of the colours are correctly aligned.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of performing print registration in a can decorator having a blanket wheel and a plurality of inking stations, each inking station having a print cylinder and a rotatable shaft defining a cylinder portion that defines a constant diameter over the cylinder portion, the method comprising:

for each of one or more of the inking stations, performing a set-up procedure including using a rotary encoder to detect an angular position of the print cylinder relative to the rotatable shaft on which the print cylinder is mounted, and adjusting the angular position of the print cylinder relative to the shaft using the detected angular position.

2. The method according to claim 1, wherein using the rotary encoder to detect the angular position of the print cylinder relative to the rotatable shaft comprises the step of measuring an angular position of the print cylinder relative to a location on the respective inking station.

3. The method according to claim 1, further comprising the steps of:

for one or more of the inking stations, using a linear position sensor to detect an axial position of the print cylinder relative to the rotatable shaft, and adjusting the axial position of the print cylinder on the shaft using the detected axial position.

4. The method according to claim 1, wherein the rotary encoder is an induction encoder.

5. The method according to claim 1, wherein said step of adjusting the angular position of the print cylinder on the shaft using the detected angular position comprises displaying the detected angular position on a display whilst manually performing the adjustment.

6. The method according to claim 1, wherein the rotatable shaft is geared to the blanket wheel.

7. The method according to claim 1, wherein the rotary encoder comprises a first section and a second section, the first section being in a fixed position relative to a main body of the inking station and the second section being in a fixed position relative to the print cylinder.

8. The method according to claim 7, wherein the first section is attached to the main body of the inking station.

9. The method according to claim 8, wherein the second section is attached to the rotatable shaft.

10. The method according to claim 7, wherein the first section comprises active components and the second section comprises a passive device.

11. The method according to claim 7, wherein the rotary encoder is an induction encoder.

12. The method according to claim 11, wherein the induction encoder comprises a laminar construction comprising etched copper or printed coils.

13. The method according to claim 11, wherein said print cylinder is mounted on the rotatable shaft via a sleeve, wherein a second section of the induction encoder is fixed to the sleeve, opposed to but spaced apart from a first section of the induction encoder.

14. The method according to claim 1, further comprising the steps of measuring an axial position of the cylinder relative to the shaft and providing an electrical signal indicative of the axial position to an operator interface device by a linear position sensor.

* * * * *